MESSAGE VERIFICATION USING ASSOCIATIVE MEMORY TECHNIQUES

Filed Jan. 6, 1965 8 Sheets-Sheet 1

INVENTOR.
JOSEPH J. KOONTZ
BY
Moody and Phillion
ATTORNEYS

Sept. 17, 1968 J. J. KOONTZ 3,402,389

MESSAGE VERIFICATION USING ASSOCIATIVE MEMORY TECHNIQUES

Filed Jan. 6, 1965 8 Sheets-Sheet 2

INVENTOR.
JOSEPH J. KOONTZ

BY
Moody and Phillips
ATTORNEYS

INVENTOR.
JOSEPH J. KOONTZ
BY
Moody and Phillion
ATTORNEYS

Sept. 17, 1968 J. J. KOONTZ 3,402,389

MESSAGE VERIFICATION USING ASSOCIATIVE MEMORY TECHNIQUES

Filed Jan. 6, 1965 8 Sheets-Sheet 4

INVENTOR.
JOSEPH J. KOONTZ
BY
Moody and Phillion
ATTORNEYS

Sept. 17, 1968 J. J. KOONTZ 3,402,389

MESSAGE VERIFICATION USING ASSOCIATIVE MEMORY TECHNIQUES

Filed Jan. 6, 1965 8 Sheets-Sheet 5

INVENTOR.
JOSEPH J. KOONTZ

BY Moody and Phillion
ATTORNEYS

MESSAGE VERIFICATION USING ASSOCIATIVE MEMORY TECHNIQUES

Filed Jan. 6, 1965 8 Sheets-Sheet 6

INVENTOR.
JOSEPH J. KOONTZ
BY
Moody and Phillion
ATTORNEYS

Sept. 17, 1968 J. J. KOONTZ 3,402,389

MESSAGE VERIFICATION USING ASSOCIATIVE MEMORY TECHNIQUES

Filed Jan. 6, 1965 8 Sheets-Sheet 7

INVENTOR.
JOSEPH J. KOONTZ
BY Moody and Phillips
ATTORNEYS

INVENTOR.
JOSEPH J. KOONTZ
BY Moody and Phillion
ATTORNEYS 3,402,389
MESSAGE VERIFICATION USING ASSOCIATIVE MEMORY TECHNIQUES Joseph J. Koontz, Dana Point, Calif., assignor to Collins Radio Company, Cedar Rapids, Iowa, a corporation of Iowa Filed Jan. 6, 1965, Ser. No. 423,723
12 Claims. (Cl. 340—146.1)

ABSTRACT OF THE DISCLOSURE

An error detecting means in which words transmitted to a receiver are also transmitted to a storage device comprising a bank of N shift registers, one for each bit of a word. As each word is transmitted it is entered into the shift register, and the words already stored are advanced one stage in the bank of registers. The words received at the receivers are retransmitted back to the transmitter site and compared substantially simultaneously with all of the words stored in the bank of shift register. When coincidence is determined between a retransmitted word and a word stored in the shift registers, the word stored in the shift registers is erased therefrom. If a word advances through all stages of the shift registers, it is assumed an error has occurred and the word is transmitted again.

This invention relates generally to means for verifying the accuracy of a coded message transmitted from one place to another and, more particularly, to a system for verifying messages whereby the characters received at the receiver are transmitted back to the transmitter and are there compared with the originally transmitted message which has been stored in a suitable memory.

The detection and correction of errors occurring in transmitted intelligence has long been a problem in communication systems. There are several different types of errors that can occur. For example, the signal to be transmitted might contain an error in the signal actually generated and transmitted. The receiver may detect the transmitter's signal quite properly but will, of course, also reproduce the error contained therein. One means for correcting such type error, particularly in binary type signals, involves what is known as a parity check, wherein an additional bit is always transmitted with each character so that the number of marks and spaces in any given character is always an even or an odd number.

Another type error occurs in the transmission medium, or at the receiver itself. In such cases, the signal may be generated and transmitted correctly but due to perturbations either in the transmission medium or to some malfunction of the receiver, may be detected incorrectly at the receiver.

The detection of the last-mentioned type error can also be effected by means of the parity check and, in some types of binary codes, can be corrected. Such methods and procedures are well known in the art and will not be discussed in detail herein. Other means for insuring accuracy in transmitted information involves double or sometimes triple transmission of each character.

The detection and correction of an error at the receiver involves considerable circuitry and necessitates the use of particular type codes, which for some purposes are not as suitable as other type codes. Furthermore, in the case of parity check, there is the possibility of two errors occurring in a given character so that the parity check would not indicate the presence of any error. Although in most modern transmission systems the occurrence of two errors in a given character is quite remote, there are applications where even such remote possibilities become of sufficient importance to make the system unsuitable unless such errors are detected and corrected.

It is an object of the present invention to provide a system of detecting and correcting all errors occurring either in the transmission medium or at the receiver in a binary code type transmission system.

A further object of the invention is to provide a storage unit at the transmitter which stores the transmitted characters at the transmitting station for a given interval of time and then compares the stored characters with the characters that have been received at the receiver and which have been transmitted back to the transmitter for purposes of comparison.

A further object of the invention is the verification of the correct reception of a transmitted message at a remote receiver location and automatic retransmission of the message if verification is not obtained.

A fourth aim of the invention is verification of the correct reception of a message transmitted to a remote receiver, which verification is substantially independent of the time delay involved and, further, which is substantially independent of jitter in the system, that is, perturbation in the synchronizing signal.

A fifth object of the invention is verification of the correct reception of a message transmitted to a remote receiver, in which the verifying signals from the receiver do not have to be returned in the same order as the original characters were transmitted, and in which transmission from the transmitter can be continuous even during the verification procedure.

Another aim of the invention is the improvement of message verification systems generally.

In accordance with the invention there is provided a plurality of shift registers, said plurality of shift registers equaling the number of data bits in a single character. The bits of a character to be transmitted are, at the time of transmission, also supplied one each to the first stages of each of the plurality of shift registers so that the first bit of the character is supplied to the first stage of the first shift register, the second bit is supplied to the first stage of the second shift register, and so on. As each succeeding character is transmitted and supplied to the shift register, the bits of the preceding character are moved to succeeding stages of the shift registers by appropriate shift pulses.

At the same time that characters are being supplied to the shift register, transmission of the characters to the receiver is occurring. A the receiver the characters are immediately transmitted back to the transmitter site, where they are compared with the characters stored in the storage unit. If the messages have been transmitted correctly each of the characters transmitted back from the receiver to the transmitter site will have its counterpart stored in the storage unit. A comparison of each character received from the receiver is made with each of the characters stored in the storage unit and when coincidence occurs the character stored in the storage unit is cleared therefrom.

If any character stored in the storage unit should be shifted to the last stages of the shift registers of the storage unit, and then shifted out of said last stages, provision is made for such character to be recirculated back to the transmitting circuitry and retransmitted to the receiver. The fact that coincidence of said retransmitted character and a character from the receiver did not occur, indicates an error either in transmission or reception of the character, thus establishing the need for retransmission.

The number of stages in the shift registers forming the storage unit should be sufficient so as to accommodate the delay incurred in transmitting the signal from the transmitter to the receiver and then back to the transmitter for verification purposes.

In accordance with a feature of the invention, the verification of the character received back from the receiver is independent of the order in which messages are transmitted. The only limitation on the verification of messages received at the transmitter from the receiver is that they be received from the receiver within a time interval equal to the time required to fill the shift register storage unit with characters.

The above-mentioned and other objects and features of the invention will be more fully understood from the following detailed description thereof when read in conjunction with the drawings in which.

Figure 2:
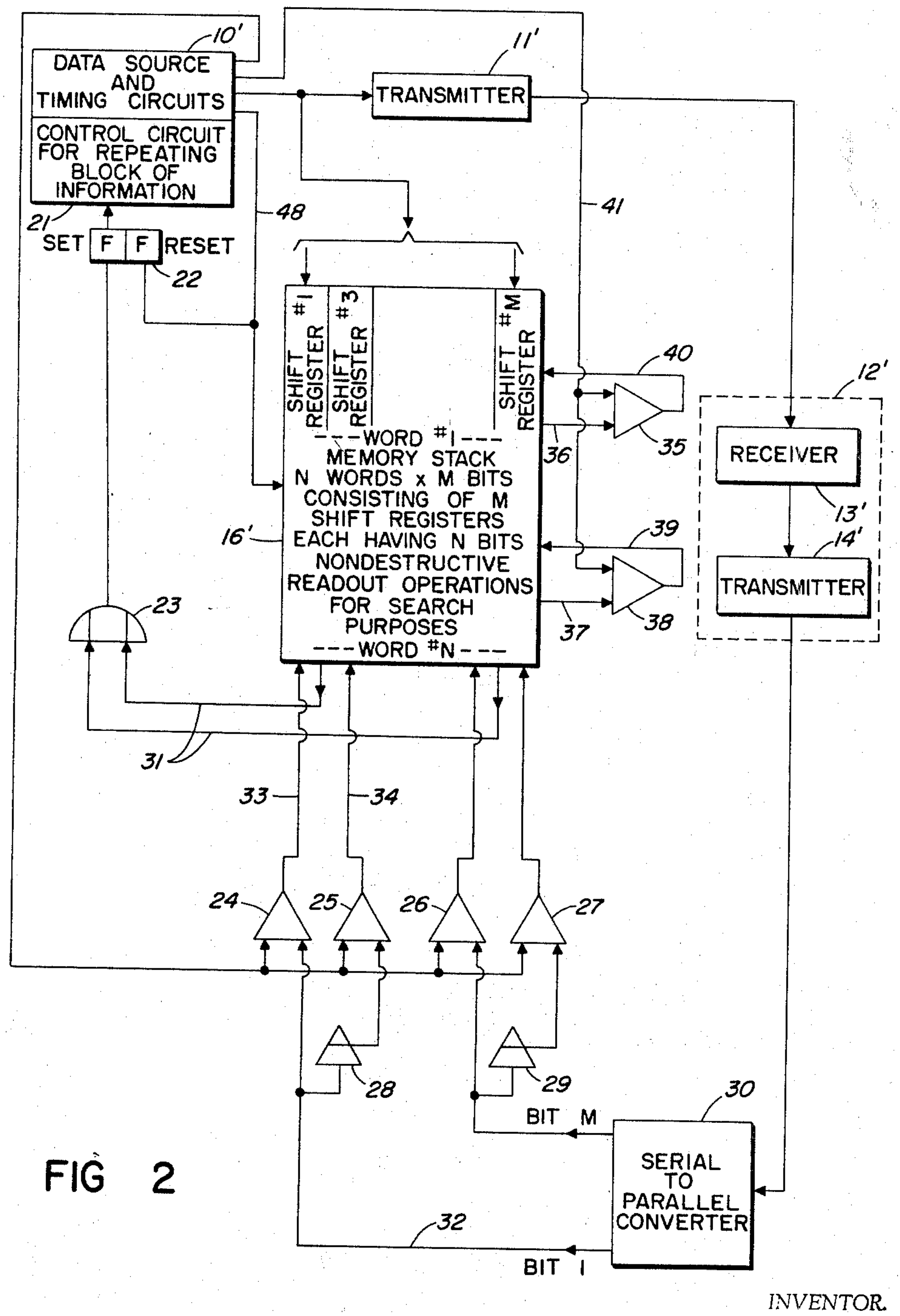
FIG. 2 shows a more detailed functional diagram of the invention.
Figure 2A:
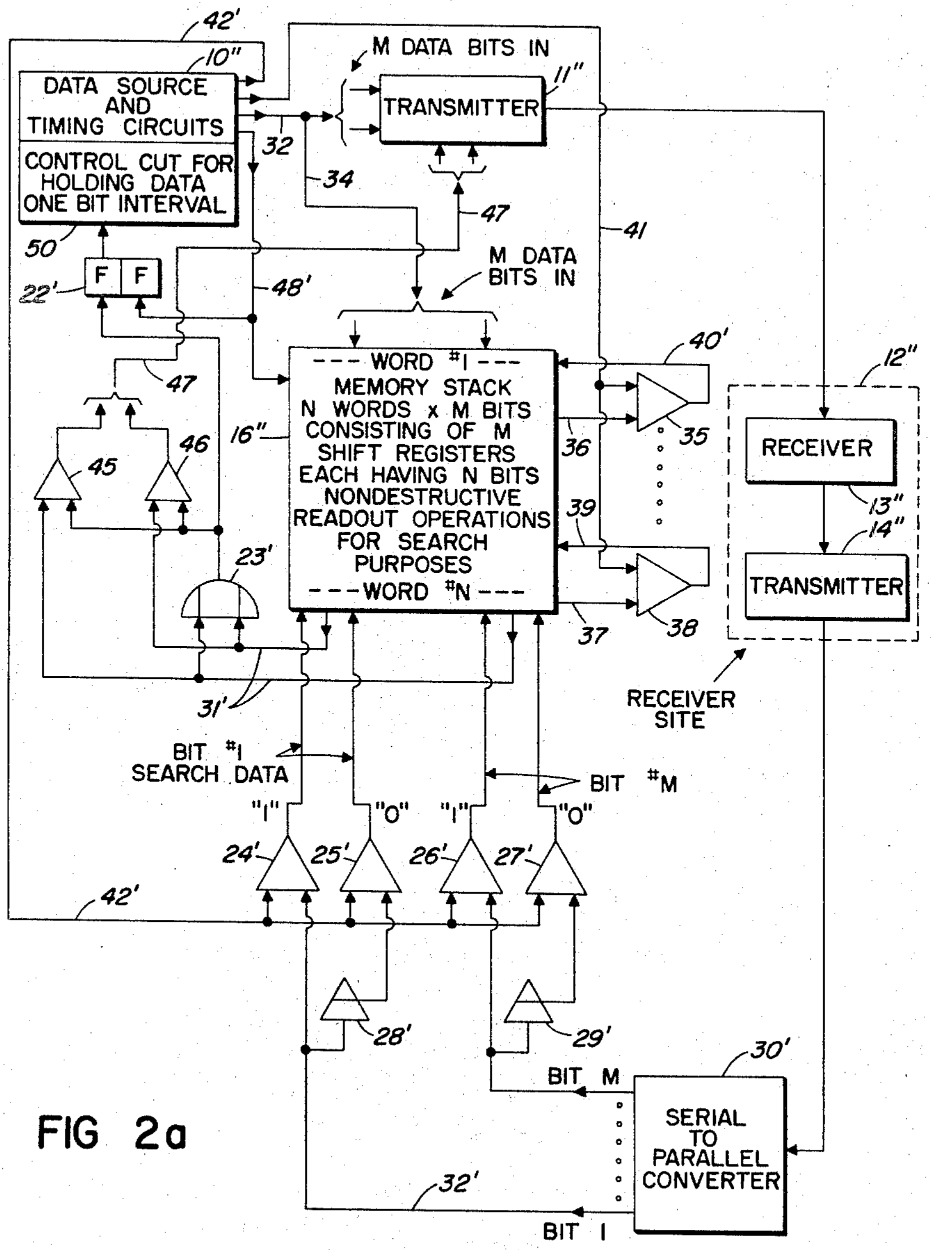
Figure 5:
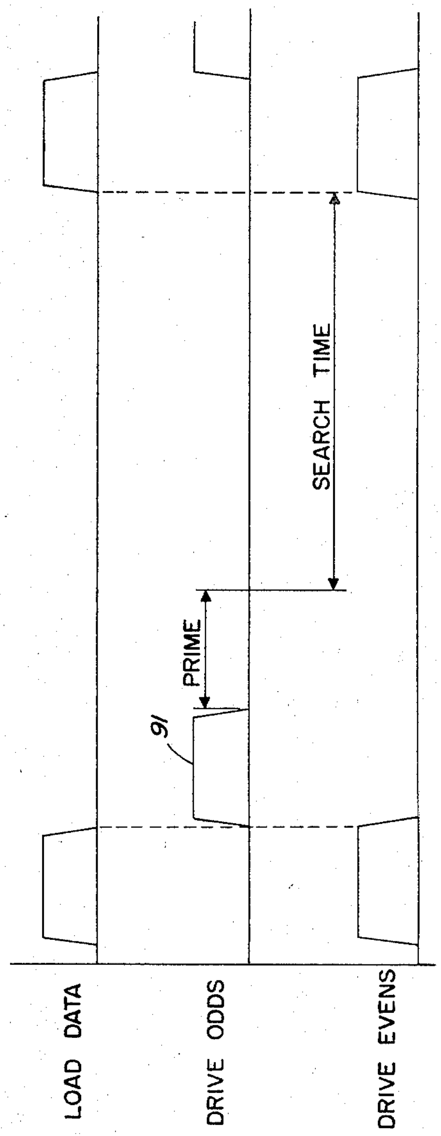
Figure 4:
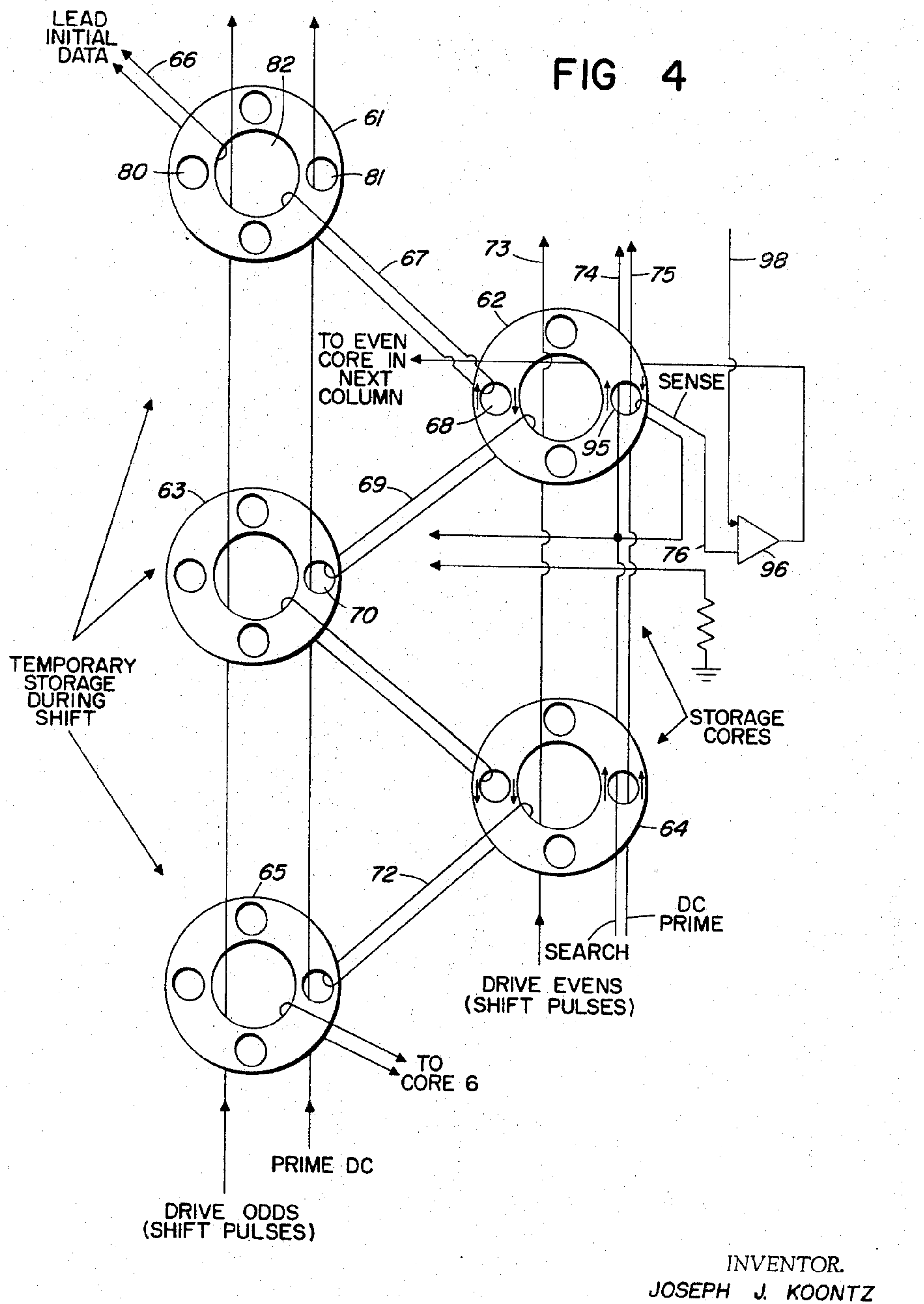
Figure 5A:
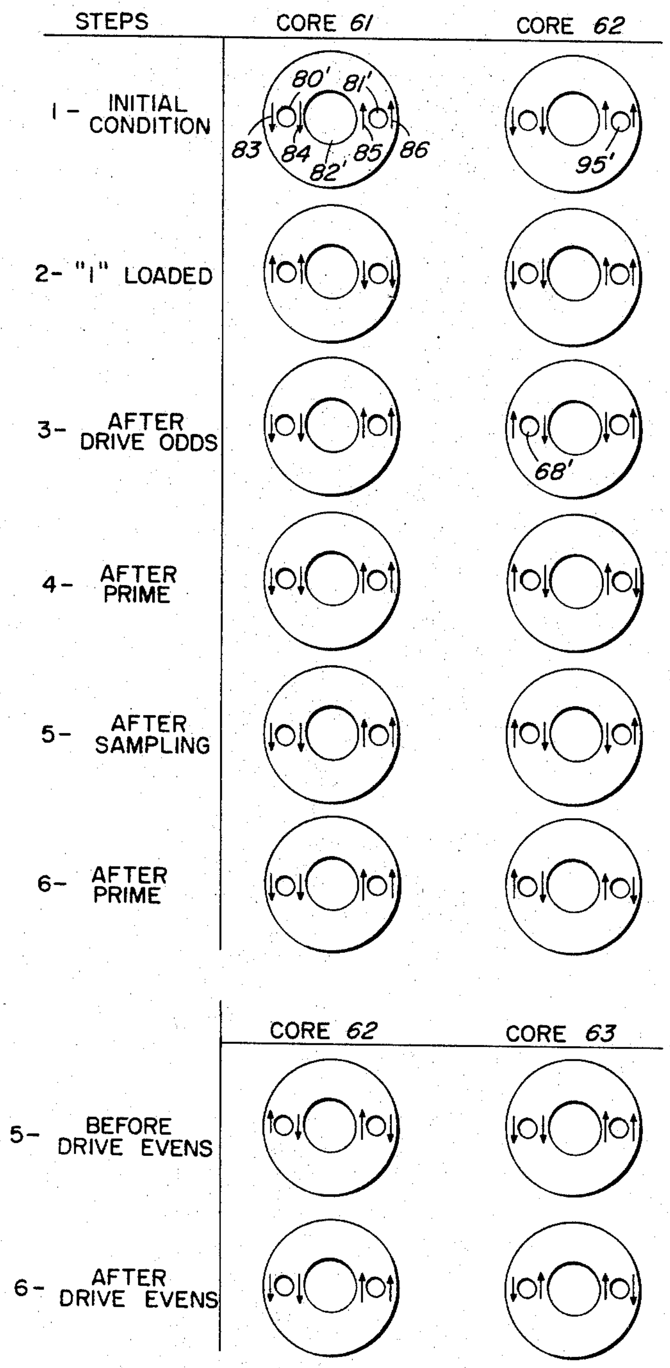
Figure 6:
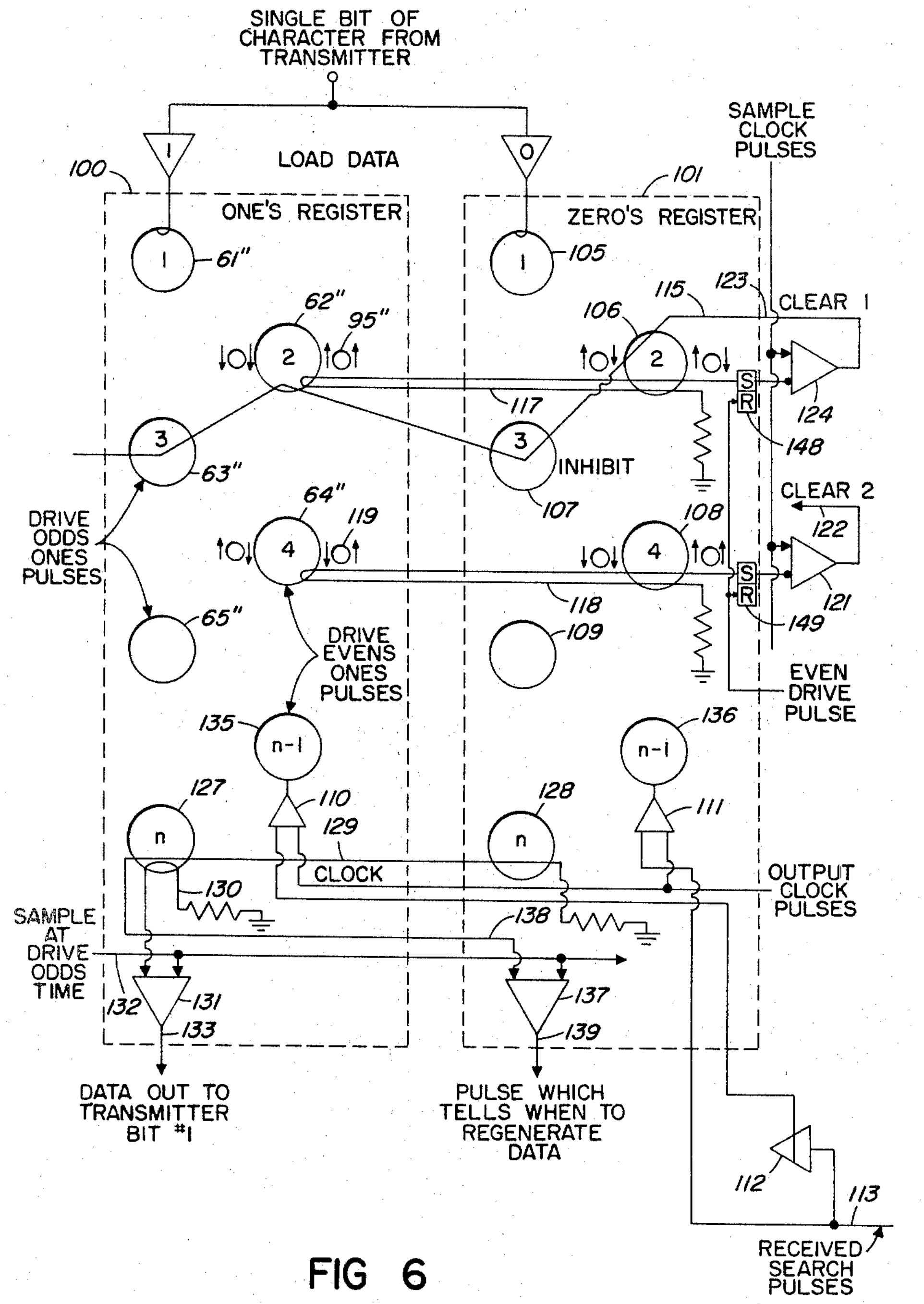
Figure 7:
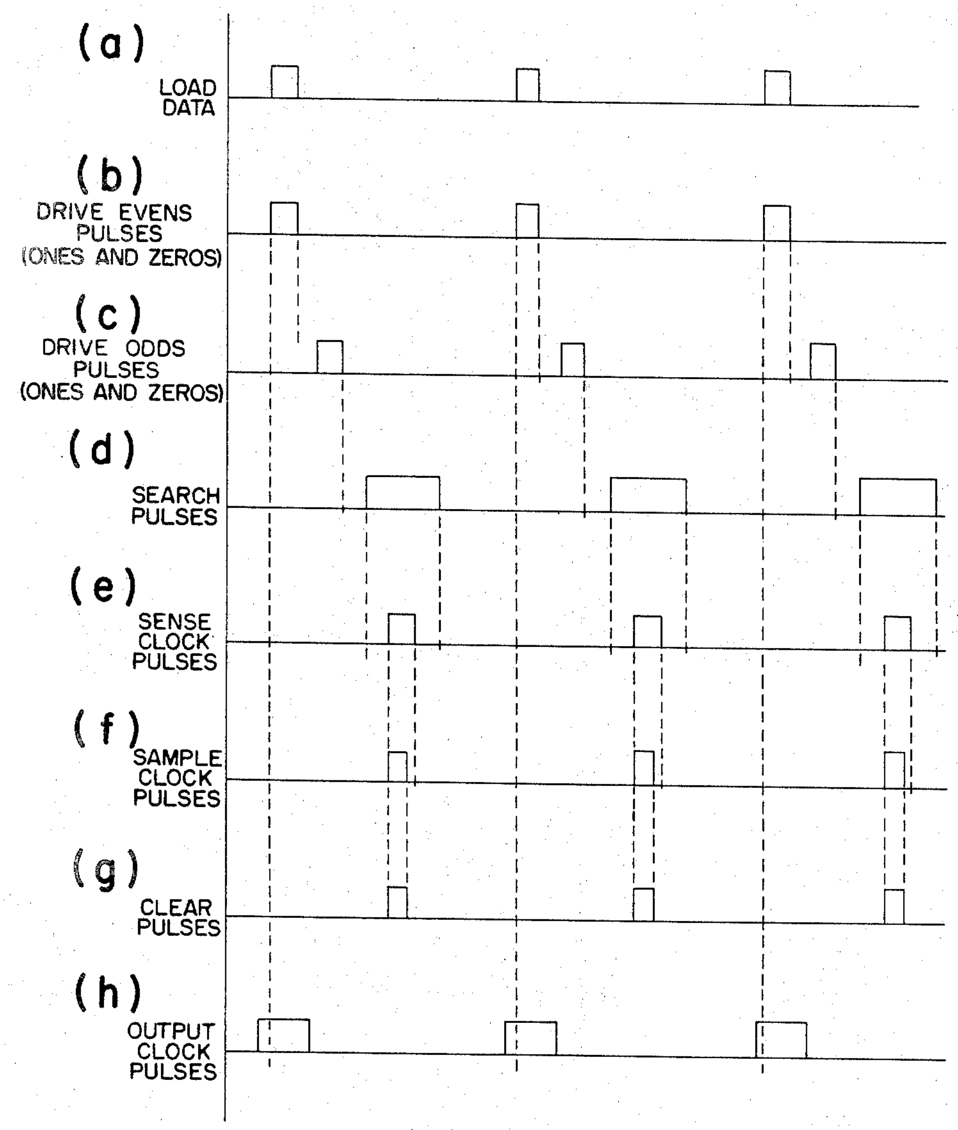

FIG. 2*a* shows still another detailed functional diagram of the invention;

FIGS. 3*a* through 3*d* illustrate the operation of a multiaperture core device;

FIG. 4 shows a shift register employing multiaperture cores;

FIG. 5 is a set of curves showing the operation of a shift register of FIG. 4;

FIG. 5*a* is a chart showing the changes of magnetic flux in response to various energizations of the magnetic cores of the shift register of FIG. 4;

FIG. 6 is a functional diagram of the storage portion of the invention employing shift registers comprised of multiaperture magnetic cores; and FIG. 7 is a set of waveforms showing the timing and operational signals used in the shift registers of FIG. 6.

Figure 1:
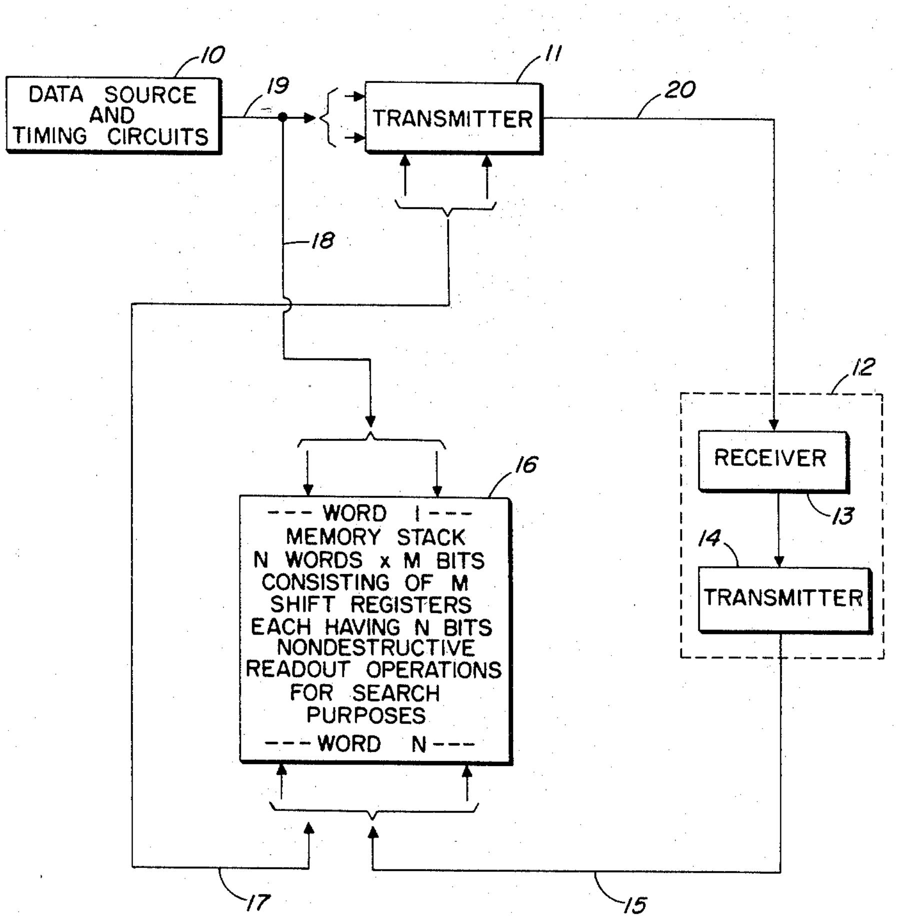
FIG. 1 shows a broad functional diagram of the invention.

Referring now to FIG. 1, the data and the necessary timing signals are generated by circuitry designated generally by block 10. The data is supplied via leads 19 in parallel form to the transmitter 11. The transmitter 11 performs the necessary amplification and modulation and then transmits the signal to the receiver site 12 via a suitable transmission media 20 which can be either a wire connection or a wireless connection.

The data from the source 10 is also supplied in parallel to a storage unit 16 which consists of a plurality of shift registers with one shift register being employed for each data bit in a character. For example, if a 16-bit character is being transmitted there would be 16 shift registers in the memory stack or storage unit 16, with the first data bit being supplied to the first stage of the first shift register, the second data bit being supplied to the first stage of the second shift register, and so on up to and through the 16 data bits.

As each character is generated by the data source 10 and supplied to the transmitter and also to the storage unit 16, the storage unit gradually becomes filled. More specifically, as the second character is supplied to the shift registers in the storage unit, the immediately preceding character is shifted into the second stages of the various shift registers, and then into succeeding stages of the shift registers, as additional characters are supplied thereto.

In the meantime, the receiver 13 has been receiving the transmitted data and functions to supply such data to the transmitter 14 located at the receiver. The transmitter 14 re-transmits the received data back to the original transmitting site via lead 15 and, more specifically, to the storage unit 16 at the original transmitter site.

The data re-transmitted back to the storage unit 16 is supplied to the storage unit 16 in parallel form and is compared with each character stored in the shift registers of storage unit 16. If coincidence exists between any character stored in storage unit 16 and the character re-transmitted back from the receiver site, such coincidence is detected and the coinciding character which is stored in storage unit 16 is erased, i.e., cleared from storage unit 16.

The number of stages in the shift registers of the storage unit 16 is sufficient to accommodate the time delay involved in transmitting a signal to the receiver site 12 and then re-transmitting said signal back to the storage unit 16. If no errors have occurred in the transmitting medium or at the receiver site, every character supplied to the storage unit 16 from the original data source 10 will be erased therefrom by a coinciding character transmitted back from the receiver site.

However, if an error should occur and a character transmitted back from the receiver site has accumulated an error somewhere, either in the transmitting medium or at the receiver, there will obviously be one character in the storage unit 16 which will not be erased because it will not have a matching character from the receiver site. Such nomatching character will eventually work itself down through the various stages of the shift registers and will be supplied at the outputs thereof and then, through leads 17, will be supplied back to transmitter 11 for re-transmission.

Actually, the information being transmitted by the transmitter 11 is transmitted in blocks in most cases and if an error is found in any given character, then it is easier to re-transmit the whole block of characters rather than to simply re-transmit the single character which contains an error. The principal reason why it is easier to re-transmit an entire block of characters is that if a single character is re-transmitted it would be necessary to somehow determine precisely where the character to be re-transmitted was to be placed in the original series of characters transmitted. Such positioning of the re-transmitted signal would require some type addressing system and, further, would require searching the originally transmitted data and selecting the erroneous character, erasing it, and then replacing it with the newly transmitted and corrected character. Consequently, the re-transmission of an entire block of characters is usually found to require less equipment and is easier to implement.

In FIG. 2 there is shown a block diagram of a system for causing the data source 10′ to re-transmit such a block of information in the event of an error in the received signal. More specifically, if a character has passed through all the stages of the shift register and is caused to be supplied to the output leads 31 of the shift register, a signal will appear at the output of the OR gate 23. It should be noted that in the block diagram of FIG. 2 at least one mark must be present in the signal in the character supplied to the OR gate 23 in order for an output to occur therefrom. The output from the OR gate 23 is supplied to a flip-flop circuit 22, causing the said flip-flop to assume a particular state which will, in turn, energize the control circuit 21. Control circuit 21 is constructed to cause the data source generator 10′ to regenerate the particular block of information containing the erroneous signal. The specific control circuit structure of block 21 is not shown or described herein since such structure is well known in the art and the details do not per se form a portion of the present invention.

The comparison of the character stored in storage unit 16′ and the character re-transmitted from the receiver site actually occurs within storage unit 16′ in the particular embodiment of the invention shown herein. However, it is necessary that a space (zero) must somehow be represented by a pulse in order for comparison to occur. In other words, if a zero ordinarily were represented by the absence of a pulse, it would be quite difficult to compare zeros since the absence of a pulse would be difficult to differentiate from a normal quiescent condition. Consequently, a zero received from the transmitter site is changed into a "1" and supplied to the storage unit 16′ on a different input lead than is employed for a "1" received from the transmitter site. More specifically, refer now in FIG. 2 to the lead 32 from the serial to parallel converter 30. If a "1" is received on the lead 32, it will pass through the AND gate 24 when said AND gate 24 is opened by a search sampling pulse from data source 10' and will be supplied to the memory storage unit 16' through the input lead 33. If, however, the data bit received on lead 32 is a "0," it will not pass through the gate 24, but rather will be inverted by inverter 28 and, upon occurrence of the first search sampling pulse, will pass through the gate 25 and into the storage unit 16' through lead 34.

The specific structure contained within the storage unit 16' is shown in FIGS. 4, 5, 5*a*, and 6 herein and in the discussion relating to such figures, the specific need and use of the signals appearing on the various leads of FIG. 2, such as leads 33 and 34, will become apparent.

In the event that coincidence occurs between a stored character and a character being verified, the stored character is cleared or erased from the storage unit 16'. Such erasure occurs as follows. When coincidence occurs a pulse will be produced on the lead 37 which is herein defined as a sensing lead. Such pulse will pass through the AND gate 38, which AND gate may also incorporate an amplifier, and will then be fed back through the lead 39 into the stages of the shift register containing the particular character which has just experienced coincidence with a received character. Erasure of all marks and spaces within the stages of the shift register containing this character will then occur. Here, again, a complete and detailed description of structure for creating both the sensing pulse on lead 37 and the effect of the clearing pulse upon the shift registers within the storage unit will be given later herein in connection with FIGS. 4, 5, 5*a*, and 6; particularly FIG. 6.

Referring now to FIG. 2*a*, there is shown the functional diagram of an alternative form of the invention wherein only that character containing an error is re-transmitted from the transmitter to the receiver site. Such character will be re-transmitted back to the transmitter site, along with all the other characters. However, the character containing the error will find no corresponding character in the storage unit 16'' so that eventually the originally transmitted character will work its way down through the shift registers and be supplied to output leads 31'. The output of OR circuit 23' will cause flip-flop 22' to assume a condition to energize the control circuit 50 so that transmission of the data is delayed for one bit interval. During this one bit interval the character shifted out of the storage unit 16'' is caused to pass through gates 45 and 46, then through leads 47 to transmitter 11'', which retransmits the character. Since a known finite time is required for any given character to work its way through all stages of the shift registers 16'', the precise location of the signal re-transmitted from transmitter 11'', in the originally transmitted message, is known and can be substituted for the incorrect character originally transmitted. The specific means whereby such substitution occurs in the receiver is not in and of itself a part of this invention and will not be described herein. It should suffice to state that such substitution can be made with relative ease simply by counting back the number of bits necessary to make up the time interval required for a character to work its way through the storage unit 16'' plus the time required for the signal to be transmitted from the receiver to the transmitter and then to be re-transmitted back to the receiver. It should be noted that where each character represents an independent message, such as a command, there is no need for determining the order of transmittal.

The AND gates 45 and 46, which function to pass the character from the output of the shift registers back to the transmitter 11'', are opened by the output of OR gate 23'. Thus, at least, one mark is required in a character supplied from the output of the shift register storage unit 16'' in order for gates 45 and 46 to be opened. As indicated above, and as will be described in detail later with respect to FIG. 6, both marks and spaces are indicated by positive settings within the shift registers 16'' (FIG. 2*a*) so that the presence of either a space or a zero in any given bit position in the last stage of the shift registers will produce a pulse on one of the output leads 31'. It is only when coincidence exists between all "1's" and all "0's" in the stored and the received characters that the stages of the shift registers are cleared so that no signal will be supplied to output leads 31'. In other words, with the arrangement of shift registers employed in storage unit 16'', the condition of a mark, a space, or a cleared position, are three separate and distinct conditions. This will become more apparent from the following discussion.

Figure 3D:
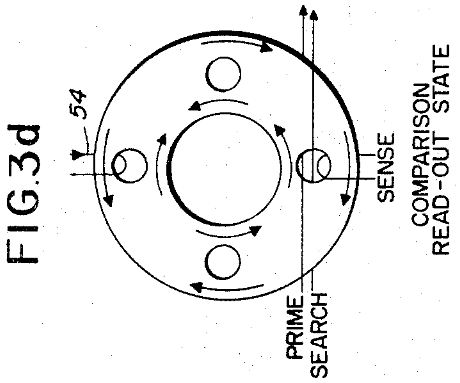
Figure 3C:
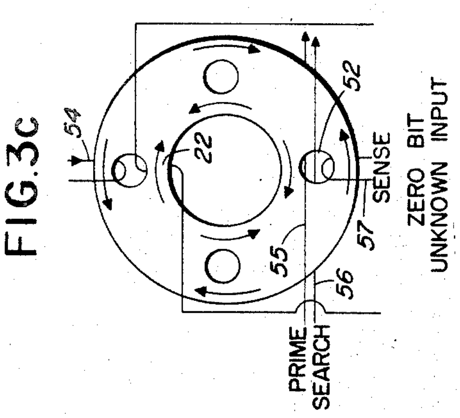
Figure 3B:
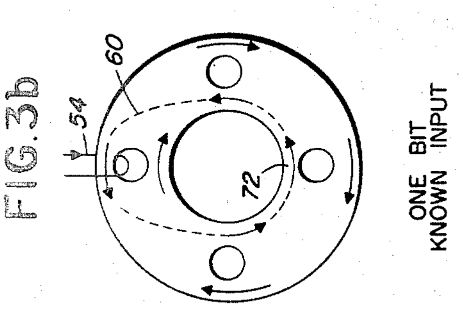
Figure 3A:
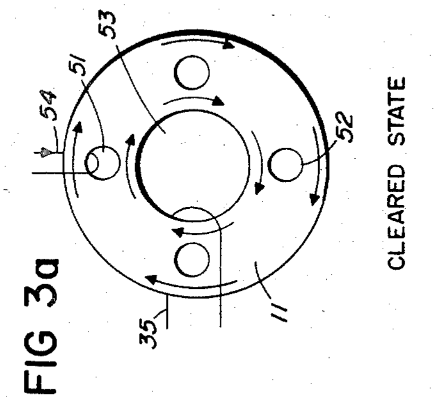

Referring now to FIG. 3*a* through FIG. 3*d*, there is shown a magnetic core having at least two minor apertures and one major aperture therein. The two minor apertures are designated by reference characters 51 and 52 and the major aperture by reference character 53. Such multiaperture cores are old and are well known in the art and have the characteristic of nondestructive readout, as will be discussed below. In the cleared state, as shown in FIG. 3*a*, the flux is unidirectional and is arbitrarily chosen as being in a clockwise direction. Energization of the winding 35 produces such clear condition of the core. In FIG. 3*b*, winding 54 has been presumed to be energized to produce a change in flux in the multiaperture core, as indicated by the dotted line 60. The amount of current passing through winding 54 is sufficient to produce the flux change shown in FIG. 3*b*. In FIG. 3*c*, a DC prime current, flowing continuously through lead 55, causes the flux around aperture 52 to be reversed from that shown in FIG. 3*b*. If a search pulse is then passed through lead 56, the flux around aperture 52 will again be reversed to the state shown in FIG. 3*b* and will induce a pulse in sensing winding 57. Once the search pulse has terminated, the DC prime current through leads 55 will again reverse the flux condition around aperture 52 to that shown in FIG. 3*c*. Thus, the readout of the multiaperture core has been accomplished without destroying the information contained therein.

It is to be noted, however, that if the current through winding 54 of FIG. 3*b* had not occurred, that is, if the magnetic flux in the core remained in the clear state, as shown in FIG. 3*a*, then neither the prime current nor the search current through windings 55 and 56 would have any effect upon the flux condition around the aperture 52. The above-mentioned phenomena is due to the fact that when the flux around aperture 52 is unidirectional (also known as a blocked condition of the core), the current through windings 55 and 56 is insufficient (by design) to shift the flux around the aperture 52. The current through winding 54, however, is large enough to effect a flux change around the aperture 51; even when the flux is in a unidirectional condition, as shown in FIG. 3*d*. The changes of flux around the minor apertures are thusly controlled by the magnitude of the currents through the windings which pass through these minor apertures.

With the above background of the operation of the individual core in mind, reference is now made to the structure of FIG. 4 which shows two and a half stages of a single shift register using the multiaperture cores. In FIG. 4 the data is loaded into the first core 61 by means of input winding 66 which is wound around the major aperture in the core. At this point, reference is made to the chart of FIG. 5*a* which shows the changes of flux occurring in the cores 61, 62, and 63 as information is transferred therethrough. More specifically, in the chart of FIG. 5*a* the particular steps for operation are shown in the left-hand column under the heading "STEPS" and the actual flux direction around the minor and major aperture of the cores 61, 62, and 63 are shown in the remainder of the chart as each of the steps occur.

It should be noted at the outset that the chart of FIG. 5*a* shows the changes of flux in the cores as a "1" is stepped along from core to core. If a zero is entered into the initial core 61 of FIG. 4, no flux change occurs in the core. Also, as a zero is stepped along from core to core no flux change will occur in the succeeding cores.

In FIG. 5*a* the magnetic cores are shown symbolically, i.e., only the two minor apertures 80' and 81' and the major aperture 82' are designated in core 61 and correspond to the apertures 80 and 81, and the major aperture 82 of the core 61 of FIG. 4.

In the initial condition the flux of core 61 is as shown in step 1, and the flux of core 62 is also shown. It will be noted that both the cores 61 and 62 are in a cleared condition with all flux in a counter-clockwise direction. If a "1" is loaded into the core 61 of FIG. 4, via input windings 66, the magnetic flux of core 61 will switch to a clockwise direction, as shown in step 2. The pulse generated in winding 67, which couples the major aperture of core 61 to the minor aperture 68 of core 62, is of such a polarity as to not change the flux around minor aperture 68 of core 62.

However, after the drive odds pulse in step 3, and shown as pulse 91 of FIG. 5, the flux in the core 61 will again reverse to a counterclockwise direction. The pulse generated in the coupling winding 67 is now of a polarity as to reverse the flux in the outer leg of minor aperture 68 of core 62, as shown in step 3. Simultaneously, the flux in the inner leg of minor aperture 95 will reverse directions, also as shown in step 3. The data bit "1" has now been switched from core 61 into core 62, which is the permanent storage core and from which the sampling can be taken without destroying the information stored therein. More specifically, the flux around the minor aperture 95 of core 62 is reversed by the DC priming current, as shown in step 4 of FIG. 5*a*. Priming is accomplished through lead 75 of FIG. 4. Sampling can now be effected by energizing the search winding 74 of FIG. 4 which passes through the minor aperture 95 of core 62, if a "1" is supplied as the search pulse; said search pulse actually being a pulse received back from the receiver. As a result of the "1" search pulse, the flux in the minor aperture 95 will be reversed, as shown in step 5 of FIG. 5*a*, and will generate a pulse in the sense winding 76. The presence or lack of pulses generated in the sense winding 76 are employed to energize an AND gate 96 to produce a clearing pulse on lead 99, which clearing pulse will clear all the cores in the various shift registers corresponding to the core 62 of the shift register of FIG. 4. It is to be noted that AND gate 96 will only be opened to pass a pulse during the presence on lead 98 of a sampling pulse from a suitable timing source, as will be discussed later.

It should be noted specifically that sensing winding 76 is coupled to all the cores of the various shift registers corresponding to core 62. Similar sensing windings are connected to the other even numbered cores of the various shift registers so that there is one sense winding for every horizontal row of cores. It will also be apparent that, if coincidence occurs, a "1" logic pulse will be generated when the coincidence is between a stored "1" and a search bit "1." Under these circumstances, a reversal of flux will occur, as shown in step 5 of FIG. 5*a*.

If a zero is compared with a zero in the structure of FIG. 4 no pulse will be generated. However, since it is desired that clearing occur when coincidence of all pulses occurs, it is apparent that the single shift register of FIG. 4 is not sufficient to handle both "0's" and "1's" from a given bit position of a character. It is necessary to have two shift registers for each bit of the character being transmitted; one for "0's" and one for "1's". Such an arrangement is shown in functional form in FIG. 6. In FIG. 6 one of the shift registers is shown within dotted block 100 and the other is shown within dotted block 101. If a "1" is supplied to the two shift registers 100 and 101, it is stored as a "1," that is, as a change of flux in the magnetic core 61'', but is stored as a "0" in core 105. If a "0" is supplied, it is entered into the magnetic core 105 of shift register 101 as a change in flux, that is, a reversal of flux. Thus, a "0" entered into magnetic core 105 will produce a change of flux therein so that the resultant flux is clockwise as is the case when a "1" is entered into the magnetic core 61'' of shift register 100. Thus, for any given stage of the two shift registers 100 and 101, one of the two even-numbered cores, such as core 62'' or core 106, will be storing a "1" and the other core will be storing a "0." For example, if the core 106 is storing a "1," i.e., has a flux condition similar to that of core 62 in step 4 of FIG. 5*a*, then the first stage of the shift registers 100 and 101 is defined as contataining a zero. Under these circumstances, core 62' will have a flux condition, as shown in step 1 of FIG. 5*a*.

Assume, for further purposes of clarification, that a "1" is stored in the second stage of the shift registers 100 and 101. Under these conditions the core 64'' will have a flux condition similar to that of core 62 in step 4 of FIG. 5*a*, and the core 108 of register 101 will have a flux condition similar to that of core 62 in step 1 of FIG. 5*a*. The arrows shown around the cores 62'', 106, 64'', and 108 indicate the flux conditions when the first stage of the shift register contains a "0" and the second stage contains a "1."

The shift register 100 can then be defined as the "1's" register and the shift register 101 is defined herein as the "0's" register for the bits of characters from the transmitter.

The returned data from the receiver site is also separated into "0's" and "1's" for any particular bit position of a character with the "0's" inverted to form a "1," i.e., a definite pulse. More specifically, the returned bit for the shift registers 100 and 101 of FIG. 6 is returned on lead 113.

If such returned bit is a "1" it is passed through AND gate 111 and supplied to the "0's" registers. If the bit is a "0," it is passed through inverter 112 and gate 110 and then to the "1's" registers 100.

Thus, the "1's" are returned to the "0's" register 101 and the "0's" are returned to the "1's" register 100. The reason for this is as follows. If the "1's" were returned to the "1's" register 100 and the "0's" were returned to the "0's" register 101, then coincidence of a stored bit and a returned bit would always result in a pulse. If the sensing windings, such as the sensing winding 115 are connected in series arrangement with all the permanent storage cores, such as core 62' and core 106 in the first stage of the shift registers, the coincidence of even a single bit would produce the same result as the coincidence of two or more bits. In other words, it would be impossible to determine if coincidence occurred in all the shift registers with respect to a given stage. A more positive way of determining coincidence in all of the shift registers is to have coincidence manifest itself by the lack of a pulse, rather than the presence of the pulse. Thus, if coincidence does not occur with respect to one bit, a pulse will be present and the lack of coincidence can easily be detected.

The lack of a pulse when coincidence occurs is effected by supplying the received "1" to the "0's" register 101 and the received "0's" to the "1's" registers. It will be apparent that if a binary bit "0" is stored in the first stage of the shift registers 100 and 101, the flux in the core 106 will be as shown in FIG. 6, and the flux in the core 62'' will also be as shown in FIG. 6 (counterclockwise). Now, if a "0" is received from the receiver site via lead 113, the said "0" will be inverted by inverter 112 and upon occurrence of a searching sampling pulse, will pass through AND gate 110 to the "1's" register 100 which will include, of course, the core 62''. However, since the core 62'' has all its flux in a counterclockwise direction, the minor aperture 95' is blocked and there will be no pulse induced in the sensing winding 117. The lack of a pulse in sensing winding 117 will permit the sample clock pulse to pass through NAND gate 124 to cause clearing of cores 62'' and 106. The flip-flop such as flip-flops 148 and 149 are normally, in the absence of a sensing pulse, in their reset conditions and prepare INHIBIT AND gates 124 and 121 for passage of a sampling pulse when it occurs. When a sensing pulse occurs, however, the flip-flop, such as flip-flop 148 or 149, is set, thus blocking the AND gate 124 or 121 and prevent passage of a sampling (clearing) pulse therethrough.

Assume now the alternative case where a "1" bit is stored in a stage of the shift register. More specifically, assume that a "1" is stored in core 64″ of shift register 100. Under these circumstances, the flux in the core 64″ will be as shown in FIG. 6. The flux in the "0's" registers core 108 will also be as shown in FIG. 6. If a "1" is received on the lead 113 from the receiver site, it is passed through AND gate 111 to the "0's" registers cores, including core 108. Since core 108 is blocked no pulse will be induced in the sensing winding 118, thus indicating a coincidence between the stored and received bits. The NAND gate 121 is energized to clear cores 64″ and 108.

Assume now the case where the received bit is not coincident with the stored bit. More specifically, assume the facts to be as in the last-mentioned instance where a "1" is stored in core 64″ and there is nothing (zero) in core 108. Assume, further, that a "0" is received on the input lead 113. Such a "0" is inverted in the inverter 112 and then passed through AND gate 110 to the "1's" register 100, which includes core 64″. Since core 64″ has a flux condition, as shown in FIG. 6, a reversal of the flux around the minor aperture 119 thereof will occur to produce a pulse in the sensing winding 118. Such pulse is supplied to flip-flop 149 to inhibit AND gate 121 and prevent an output pulse on lead 122 thus preventing clearing of the permanent storage cores in the associated stages of the shift registers. For example, the clearing pulse from the output of AND gate 121 clears the cores 108 and 64″ and prevents erroneous shifting of data to cores 65′ and 109, respectively. Similarly, the clearing pulse occurring on lead 123 from AND gate 124 clears cores 106 and 62″ and prevents erroneous shifting of data to cores 63″ and 107, respectively. By clearing the cores, it is meant that all the magnetic flux therein is caused to assume a counterclockwise direction.

If a stored character should never experience a coincidence with a character transmitted back from the receiver site, said stored character will eventually work its way down to the last cores of the storage unit. The presence of a character in the last cores of the shift registers, such as cores 127 and 128 of FIG. 6, manifests itself by the presence of a "1" in one of those two cores. It should be kept in mind that a "1" in core 128 represents a "0" bit in a character which had never experienced coincidence. Thus, a character consisting of all "0's" will be detected in a positive manner since the cores representing "0's," such as core 128, will have an unblocked flux condition peculiar thereto.

A winding 129 is looped through all the major apertures of the last core of each of the two shift registers representing each bit. When the even drive pulses drive the last permanent storage cores in each shift register, such as cores 135 and 136, and there is an unblocked condition in any of such last even-numbered magnetic cores, a flux change will occur in the corresponding last core of the associated shift register, such as cores 127 and 128, for example. Such flux change will produce a pulse in the winding 129 which, in the presence of a sampling pulse on lead 138, will pass through AND gate 137 to the output terminal 139 thereof and, referring to FIG. 2, will set flip-flop 22 to energize control circuit 21, thus causing retransmission of the block of information. It is to be noted that OR gate 23 does not appear in FIG. 6 but is the equivalent of the winding 129 and AND gate 137 of FIG. 6. The use of the OR gate 23 of FIG. 2 is functional and is used therein simply because it facilitates description of the basic concept of the invention.

In the event that only the character containing the error is to be re-transmitted, the output signal of AND gate 137 of FIG. 6 is also utilized in the embodiment of FIG. 2*a*. More specifically, the output of OR gate 23′ of FIG. 2*a* which corresponds to the output of AND gate 137 of FIG. 6, sets flip-flop 22′, which energizes control circuit 50. As discussed hereinbefore, the control circuit 50 functions to delay transmission of data for one bit interval. During this one bit delay interval, the character shifted out of the last stage of the shift registers unit 16″ is supplied through AND gates, such as AND gates 45 and 46, to transmitter 11″ to be re-transmitted.

Referring again to FIG. 6, the character shifted out of the last stages of the shift registers is so shifted in the following manner. The AND gate associated with each of the pair of "1's" and "0's" shift registers is an AND gate which specifically has an input connected to the last core of the "1's" registers only. Thus, AND gate 131 has one of its inputs connected to the magnetic core 127 of the "1's" register 100. The sample pulse which opens AND gate 137 enabling regeneration of data also functions to open AND gate 131 to permit the data to be read from the last stage of the shift register back to the transmitter.

In FIG. 7 there are shown timing diagrams for the circuit of FIG. 6, FIG. 7*a* is a waveform showing the loading of the data into the first cores 61″ and 105 of FIG. 6. Subsequently, the information stored in the core 61″ or 105 is shifted to the even-numbered core 62″ and 106, respectively, by the odd drive pulses shown in FIG. 7*c*. Next there occurs the search pulses of FIG. 7*d* which function to create sensing pulses where coincidence does not exist, as discussed above. The sensing pulse, shown in FIG. 7*e*, set the flip-flops (flip-flops 148 and 149 of FIG. 6) associated with the rows of cores in which the sensing pulses are generated. If coincidence does exist the flip-flops remain in their reset condition. After the flip-flops are set, the sample clock pulses of FIG. 7*f* occur, and will pass through only those AND gates (such as AND gates 124 and 121), having an associated flip-flop which is in a reset condition. The output pulses (clearing pulses) of the AND gates, such as AND gates 124 and 121, are shown in 7*g* and function to clear the cores in the associated row, as discussed above in connection with FIG. 6.

FIG. 7*h* represents the output clock pulses applied to the output AND gates, such as 131, and also to AND gate 137, which provides the instruction for the regeneration of the data supplied to AND gates, such as AND gate 131 from core 127.

It is to be understood that the forms of the invention shown and described herein are but preferred embodiments thereof and that various changes may be made in circuit arrangement and in the type circuits employed to perform various functions, without departing from the spirit or the scope of the invention.

I claim:

1. In a communication system including data source means, transmitter means, and receiver means, message verification means for verifying the accuracy of transitted message words and comprising:

N shift register means each having M stages where N equals the number of data bits in a message word;

means for entering the individual bits of each message word, as it is transmitted, into the first stages of said shift registred means, one data bit to each shift register;

shifting means for shifting the message words stored in said shift register means along successive stages of said shift register means as new words are entered therein;

means for transmitting the signal received at the receiver means back to the said transmitter means;

said shift register means comprising means for applying the signals representing the words transmitted back from said receiver means to each stage of each shift register means, thereby determining coincidence between the returned words and each of the words stored in said shift register means;

means responsive to coincidence between all the data bits of a particular word stored in said shift register means and a word transmitted back from the receiver means to cause clearing of said particular word from said shift register means;

and control means responsive to any non-cleared word appearing at the outputs of the last stages of said shift register means to cause said transmitter means to re-transmit said non-cleared word.

2. Message verification means in accordance with claim 1 in which:

each of said shift register means comprises a first and second shift register, said first shift register being responsive to logic "1's" supplied to said shift register means to store and shift said logic "1's";

and said second shift register being responsive to logic "0's" supplied to said shift register means to store and shift said logic "0's" as logic "1's".

3. Message verification means in accordance with claim 2 in which each of the stages of each of said first and second shift registers comprises:

first storage means and second storage means;

said first storage means providing temporary storage of data bit information as said data bits are shifted along successive stages of said shift registers;

said second storage means providing permanent storage of said data bit information when said data bits are not being shifted along successive stages of said shift registers;

and comprising means for reading the data bits stored in the last stage of each shift register at a rate equal to the word rate of the transmitted message.

4. Message verification means in accordance with claim 1 in which said control means comprises:

gating means responsive to the presence of a logic "1" or a logic "0" at the output terminal of any of said shift registers to produce an output signal;

repeat transmission command circuit means responsive to said output signal to produce an instruction signal;

said data source means responsive to said instruction signal to re-transmit the message word appearing at the output of said shift register means.

5. Message verification means in accordance with claim 4 in which:

each of said shift register means comprises a first and second shift register, said first shift register being responsive to logic "1's" supplied to said shift register means to store and shift said logic "1's";

and said second shift register being responsive to logic "0's" supplied to said shift register means to store and shift said logic "0's" as logic "1's."

6. Message verification means in accordance with claim 5 in which each of the stages of said shift registers comprises:

first storage means and second storage means;

said first storage means providing temporary storage of data bit information as said data bits are shifted along successive stages of said shift registers;

said second storage means providing permanent storage of said data bit information when said data bits are not being shifted along successive stages of said shift registers;

and comprising means for reading the data bits stored in the last stage of each shift register at a rate equal to the word rate of the transmitted message.

7. In a communication system including a transmitter site having first transmitter means and a receiver site having receiver means and second transmitter means for transmitting message words from said first transmitter means to said receiver means and then for transmitting said message words back to said transmitter site from said receiver site, message word verification means comprising:

N shift register means each having input means and output means and constructed to store in the first stages thereof the message words transmitted from said first transmitter means to said receiver means;

said shift register means constructed to shift any message words stored therein successively along the stages thereof with each new transmission of a message word;

means for supplying to said shift register means the message words transmitted back from said receiver means to said transmitter site;

said shift register means comprising means for applying the message words transmitted back from said receiver means to each stage of said shift register means to determine coincidence between the returned words and each of the words stored in said shift register means and to erase from said shift register means any stored message word which is coincident with a returned word;

and control means responsive to a particular message word stored in said shift register means over a predetermined time interval to cause said first transmitter means to re-transmit said message word to said receiver means.

8. Message verification means in accordance with claim 7 in which:

each of said shift register means comprises a first and a second shift register, said first shift register being responsive to logic "1's" supplied to said shift register means to store and shift logic "1's";

and said second shift register being responsive to logic "0's" supplied to said shift register means to store and shift said logic "0's" as logic "1's."

9. Message verification means in accordance with claim 8 in which each of the stages of each of said first and second shift registers comprises:

first storage means and second storage means;

said first storage means providing temporary storage of data bits as said data bits shifted along successive stages of said shift registers;

said second storage means providing permanent storage of said data bit when said data bits are not being shifted along successive stages of said shift registers;

and comprising means for reading the data bits stored in the last stage of each shift register at a rate equal to the word rate of the transmitted message.

10. Message verification means in accordance with claim 7 in which said control means comprises:

gating means responsive to the presence of a logic "1" or a logic "0" at the output terminal of any of said shift registers to produce an output signal;

repeat transmission command circuit means responsive to said output signal to produce an instruction signal;

said first transmitter means responsive to said instruction signal to re-transmit the message word appearing at the output of said shift registers.

11. Message verification means in accordance with claim 10 in which:

each of said shift register means comprises a first and second shift register, said first shift register being responsive to logic "1's" supplied to said shift register means to store and shift said logic "1's";

and said second shift register being responsive to logic "0's" supplied to said shift register means to store and shift said logic "0's" as logic "1's."

12. Message verification means in accordance with claim 11 in which each of the stages of each of said shift registers comprises:

first storage means and second storage means;

said first storage means providing temporary storage of data bits as said data bits are shifted along successive stages of said shift registers;

said second storage means providing permanent storage of said data bit when said data bits are not being shifted along successive stages of said shift registers;

and comprising means for reading the data bits stored in the last stage of each shift register at a rate equal to the word rate of the transmitted message.

References Cited

UNITED STATES PATENTS

| | | | |
|---|---|---|---|
| 2,121,163 | 6/1938 | Robinson | 178—23 |
| 2,740,106 | 3/1956 | Phelps | 340—147 |
| 3,228,000 | 1/1966 | Collis | 340—146.1 |

MALCOLM A. MORRISON, *Primary Examiner.*

C. E. ATKINSON, *Assistant Examiner.*